(12) United States Patent
Kang

(10) Patent No.: US 7,362,037 B2
(45) Date of Patent: Apr. 22, 2008

(54) ULTRASONIC TRANSDUCER DEVICE FOR HUMIDIFIER

(75) Inventor: Sang-Keun Kang, Busan (KR)

(73) Assignee: Ohsung Co., Ltd. (KR)

( * ) Notice: Subject to any disclaimer, the term of this patent is extended or adjusted under 35 U.S.C. 154(b) by 0 days.

(21) Appl. No.: 11/482,319

(22) Filed: Jul. 7, 2006

(65) Prior Publication Data

US 2007/0216259 A1 Sep. 20, 2007

(30) Foreign Application Priority Data

Mar. 17, 2006 (KR) .................. 20-2006-0007146

(51) Int. Cl.
*H01L 41/053* (2006.01)
(52) U.S. Cl. ...................... 310/341; 310/345
(58) Field of Classification Search ................. 310/341, 310/345, 348
See application file for complete search history.

(56) References Cited

U.S. PATENT DOCUMENTS

| | | | | |
|---|---|---|---|---|
| 3,856,279 A * | 12/1974 | Yeagle | .......... | 261/80 |
| 3,877,459 A * | 4/1975 | Harvey | .......... | 126/113 |
| 4,265,839 A * | 5/1981 | Baus | .......... | 261/91 |
| 4,747,402 A * | 5/1988 | Reese et al. | .......... | 128/204.21 |
| 5,702,648 A * | 12/1997 | White et al. | .......... | 261/142 |
| 2002/0190400 A1* | 12/2002 | Bachert | .......... | 261/81 |

* cited by examiner

*Primary Examiner*—Thomas M. Dougherty
(74) *Attorney, Agent, or Firm*—Tuchman & Park LLC

(57) ABSTRACT

An ultrasonic transducer device for a humidifier, the humidifier having a vaporizing chamber for producing water vapor or mist, the ultrasonic transducer device comprises: a transducer holder having a central opening formed in a longitudinal direction of the transducer holder and a flange portion disposed at a periphery of the transducer holder, the transducer formed of synthetic resin or plastic materials; an ultrasonic transducer disposed at the central opening of the transducer holder; a support member formed of metal and having an upper planar section and a side section extending vertically from the upper planar section, the upper planar section defining an opening therein for coupling with the flange portion of the transducer holder; and a heat discharge plate having heat discharging fins and coupled with the support member, the heat discharge plate coupled with a circuit board for discharging heat in the circuit board.

9 Claims, 3 Drawing Sheets

US 7,362,037 B2

ULTRASONIC TRANSDUCER DEVICE FOR HUMIDIFIER

FIELD OF THE INVENTION

The present application relates to an ultrasonic transducer device for a humidifier for producing suitable humidity to an environment, more particularly to an ultrasonic transducer device for a humidifier, in which a transducer holder for holding an ultrasonic transducer is formed of synthetic resin or plastic material in order to provide vaporizing water without containing harmful or toxic substances therein.

BACKGROUND OF THE INVENTION

As well-known in the art, a humidifier is typically composed of a container body having a water tank installed therein for providing water to a humidifying or vaporizing chamber with a vaporizing element, such as an ultrasonic transducer, which produces and emits water vapor or atomized water to the surrounding air.

According to one conventional ultrasonic transducer device of a humidifier as shown in FIG. 3, transducer holder 40 formed of metal is inserted at an opening of base frame 101 of vaporizing chamber 1B and fixed to the base frame 101 with bolts 60. Ultrasonic transducer 90 is installed at a central opening of the transducer holder 40, with cover 110 covering the bottom side of the transducer 90 and fixed by bolts 60 as shown. Case 50 is attached to side flange portion of the transducer holder 40 with bolts 60, and a circuit board 80 is installed within the case 50.

Because the transducer holder 40 formed of metal is exposed in the water, it becomes corroded over an extended use in the water while forming metal oxides and germs thereon. This ultimately causes the humidifier to produce a harmful or noxious water vapor to the environment, and the life time of the transducer device becomes reduced due to these disadvantages and drawbacks.

SUMMARY OF THE INVENTION

In order to solve the above problems associated in the conventional ultrasonic transducer device, the present invention provides an ultrasonic transducer device having a transducer holder formed of synthetic resin, such as plastic material, which does not produce noxious metallic oxides or other harmful materials when used in the water as the conventional metallic transducer holders such that the resultant humidifier can emit clean water vapor and thus enhances its life time. The ultrasonic transducer device may further include other elements and/or additional features which will be described below further in details.

According to one aspect of the present invention, the ultrasonic transducer device for a humidifier is disclosed, the humidifier including a vaporizing chamber for producing water vapor or mist, in which the ultrasonic transducer device comprises: a transducer holder having a central opening formed in a longitudinal direction of the transducer holder and a flange portion disposed at a periphery of the transducer holder, the transducer formed of synthetic resin or plastic materials; an ultrasonic transducer disposed at the central opening of the transducer holder; a support member formed of metal and having an upper planar section and a side section extending vertically from the upper planar section, the upper planar section defining an opening therein for coupling with the flange portion of the transducer holder; and a heat discharge plate having heat discharging fins and coupled with the support member, the heat discharge plate coupled with a circuit board for discharging heat in the circuit board. The ultrasonic transducer device preferably further comprises a seal member disposed at the central opening of the transducer holder, and the ultrasonic transducer is fixed to the seal member. The ultrasonic transducer device may further include a cover member disposed below the seal member for covering the central opening of the transducer holder.

The flange portion of the transducer holder preferably includes a lateral groove formed around the flange portion, and the lateral groove is securely engaged with the opening formed at the upper planar section of the support member. The transducer holder is preferably formed by plastic molding with the metallic support member inserted in a mold.

BRIEF DESCRIPTION OF THE DRAWINGS

The above and other features and advantages of the present invention will become more apparent by describing in detail below with a preferred embodiment thereof with reference to the attached drawings in which.

DETAILED DESCRIPTION OF THE INVENTION

Figure 1:
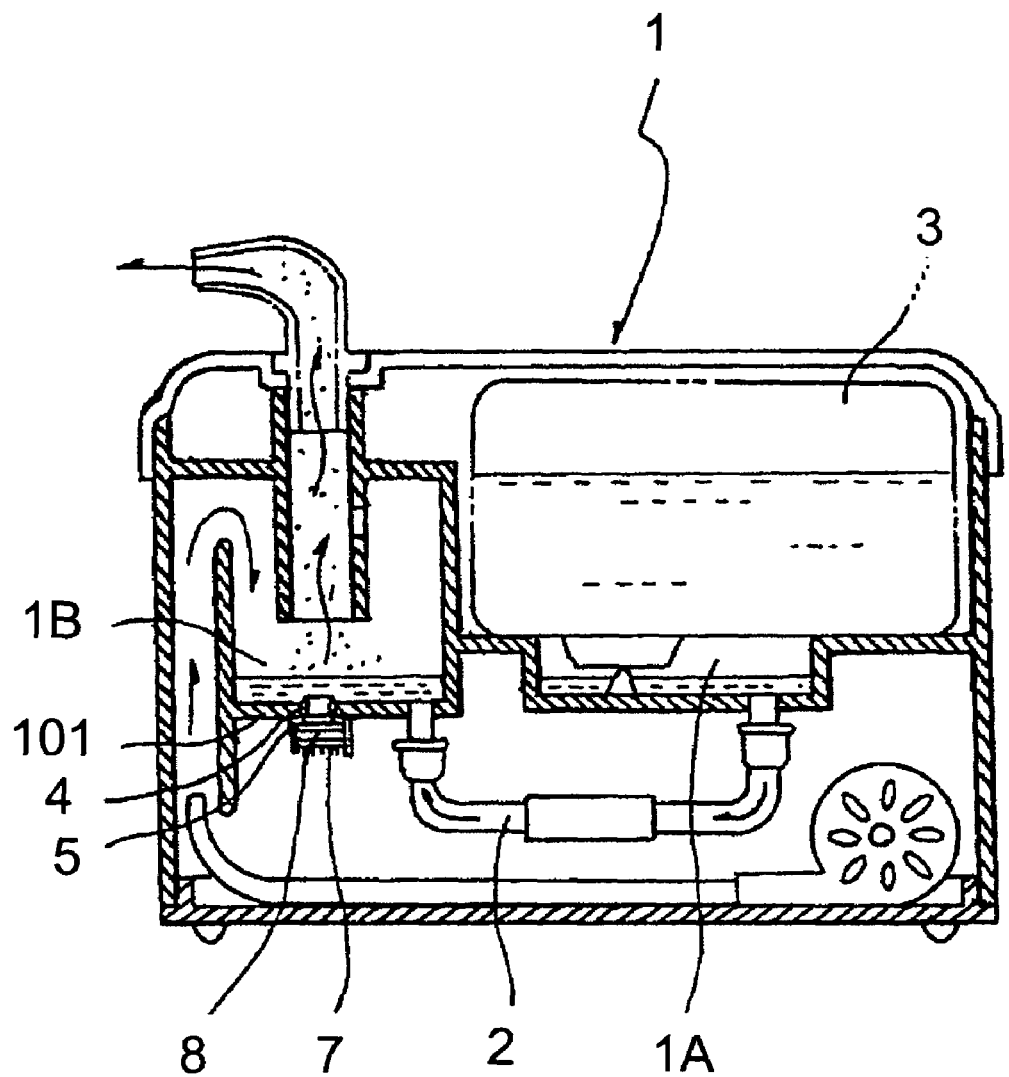
FIG. 1 is a schematic and partially cross-sectional view illustrating an exemplary humidifier incorporating the ultrasonic transducer device of the invention.
Figure 2:
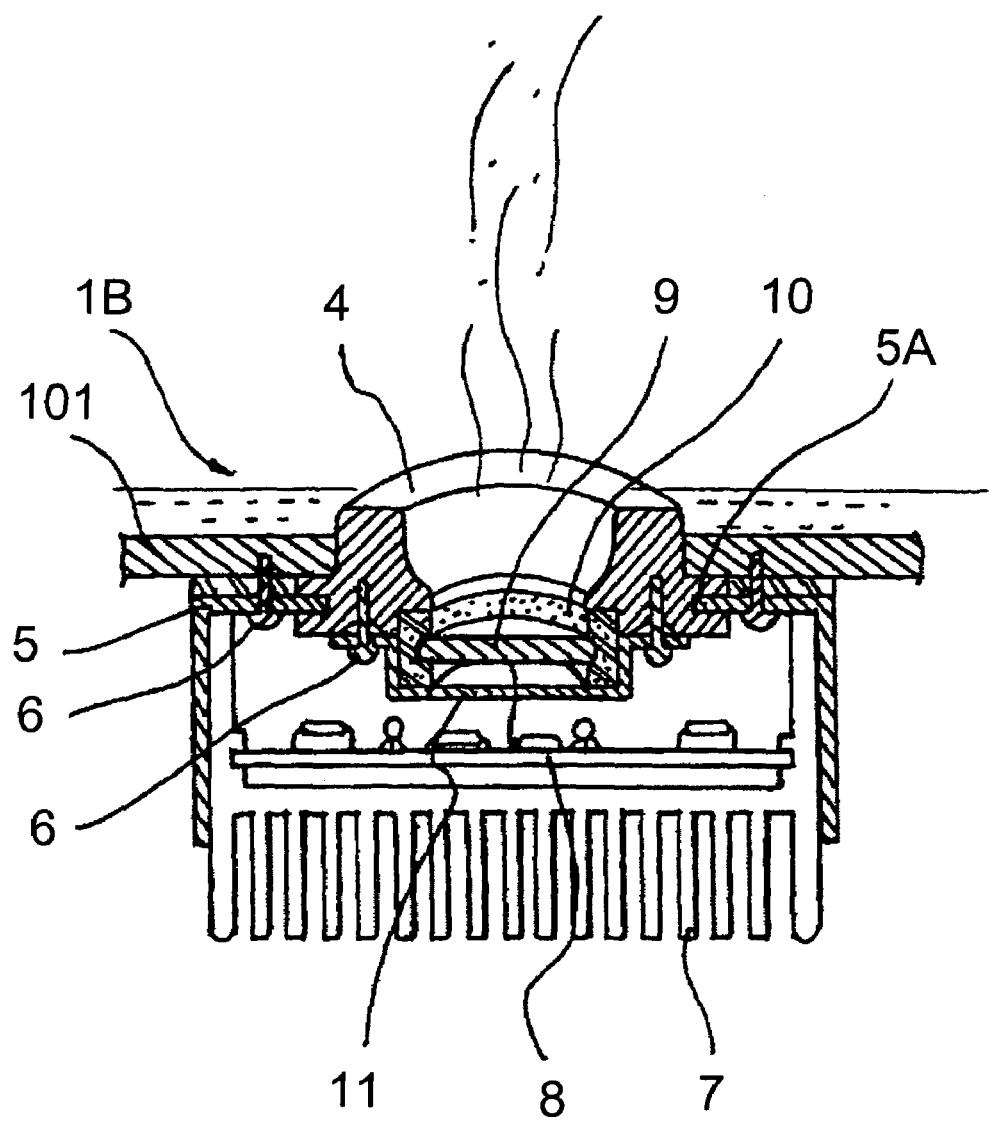
FIG. 2 is a schematic and partially cross-sectional view, while enlarged showing an exemplary structure, of the ultrasonic transducer device of FIG. 1.
Figure 3:
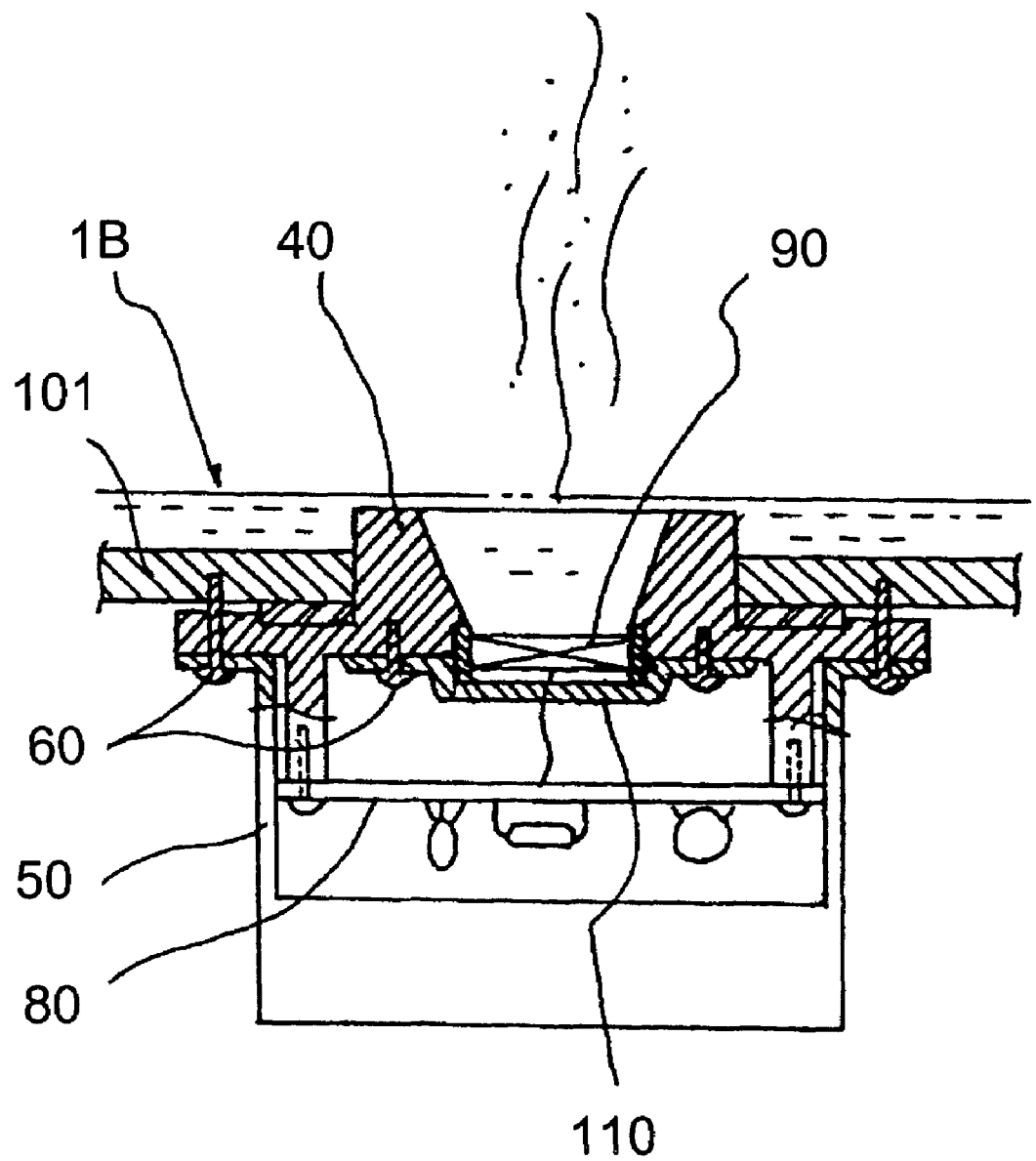
FIG. 3 is a schematic and partially cross-sectional view, while enlarged showing the structure, of a conventional ultrasonic transducer device.

Referring to FIGS. 1 and 2, humidifier 1 includes a container body having a water tank 3 installed therein for retaining water, a water chamber 1A disposed below the water tank 3 for receiving water from the water tank, a vaporizing or atomization chamber 1B for producing water vapor or mist by a transducer 9 disposed in a transducer holder 4 (in a manner to be described later in details) with the water supplied through a water supply tube 2 connected to the water chamber 1A.

As further details illustrated in FIG. 2, the transducer holder 4 is inserted at an opening in a base frame 101 of the vaporizing chamber 1B and fixed to the base frame 101 in a watertight manner. The transducer holder 4 includes a main body portion with a central longitudinal opening defined there-through and a peripheral flange portion for securing the transducer holder 4 to the base frame 101. A support member 5 formed of metal is attached to the flange portion of the transducer holder 4 with fastening elements such as bolts 6 in a manner as shown or in other known manners. The support member 5 preferably includes an upper planar section with a central hole 5A defined therein and a side section extending generally vertically downwards from the upper planar section. The transducer holder 4 is formed of synthetic resin such as plastic materials which do not corrode in the water. More preferably, the transducer holder 4 is formed of synthetic resin or plastic materials with heat-resistant and water-sealing characteristics and characteristics capable of avoiding or restricting formation of germs or other harmful materials thereon such that the resultant humidifier produces clean water vapor or mist.

As shown in FIG. 2, the flange portion of the transducer holder 4 may preferably include a lateral groove formed around the flange portion, and a central hole portion 5A of the support member 5 is securely affixed to the lateral groove of the transducer holder 4. This composite structure of the support member 5 and the transducer holder 4 can be made, for example, by known plastic molding methods with the metallic support 5 inserted in a mold of suitable construction.

Heat discharge member 7 with heat discharging fins arranged therein, is received in the central cavity of the support member 5 and affixed thereto. A circuit board 8 is securely fixed to the heat discharge plate 7 for discharging heat generated in the circuit board 8 upon operation of the humidifier. A transducer 9, such as an ultrasonic vibrator or transducer, is installed in a central opening of the transducer holder 4, preferably with a packing member or seal 10 engaged between the holder 4 and the transducer 9. A cover member 11 securely covers the bottom area of the central opening of the holder 4 with bolts 6 fixed thereto. Other elements, such as additional sealing members and structural elements, may be further provided in the transducer device of the invention.

As described above with an exemplary embodiment, the transducer device of the invention utilizes, as a primary novelty element, a transducer holder formed of synthetic resin or plastic materials and thus being corrosion resistant, while also preferably capable of restricting formation of germs or other harmful materials thereon such that the resultant humidifier produces clean or sanitized water vapor to the environment. In addition to the plastic transducer holder, the transducer device of the invention further utilizes a metallic support member that is affixed to the flange portion of the transducer holder, and a heat discharge member with a circuit board attached thereto is connected to the metallic support member for effectively discharging heat in the circuit board.

While the present invention has been particularly shown and described with reference to the exemplary embodiment thereof, it will be understood by those of ordinary skill in the art that various changes in form and details may be made therein without departing from the spirit and scope of the present invention as defined by the following claims.

What is claimed is:

1. An ultrasonic transducer device for a humidifier, the humidifier having a vaporizing chamber for producing water vapor or mist, the ultrasonic transducer device comprising:
   a transducer holder having a central opening formed in a longitudinal direction of the transducer holder and a flange portion disposed at a periphery of the transducer holder, the transducer holder for using in the water contained in the vaporizing chamber of the humidifier, the transducer holder being formed of synthetic resin or plastic materials resistant to corrosion from contact with the water contained in the vaporizing chamber;
   an ultrasonic transducer disposed at the central opening of the transducer holder;
   a support member formed of metal and having an upper planar section and a side section extending generally vertically from the upper planar section, the upper planar section defining an opening therein for coupling with the flange portion of the transducer holder; and
   a heat discharge plate having heat discharging fins and coupled with the generally vertically extending side section of the support member, the heat discharge plate coupled with a circuit board for discharging heat in the circuit board.

2. The ultrasonic transducer device of claim 1, further comprising a seal member disposed at the central opening of the transducer holder, and wherein the ultrasonic transducer is fixed to the seal member.

3. The ultrasonic transducer device of claim 2, further comprising a cover member disposed below the seal member and for covering the central opening of the transducer holder.

4. The ultrasonic transducer device of claim 1, further comprising fastening elements disposed around the opening of the support member for connecting the support member with a base frame of the vaporizing chamber.

5. The ultrasonic transducer device of claim 1, wherein the flange portion of the transducer holder includes a lateral groove formed around the flange portion, the lateral groove securely engaged with the opening formed at the upper planar section of the support member.

6. The ultrasonic transducer device of claim 5, wherein the transducer holder is formed by plastic molding with the metallic support member inserted in a mold.

7. The ultrasonic transducer device of claim 1, wherein the heat discharge plate is coupled with the circuit board in parallel with each other, and the heat discharging fins extend vertically from the heat discharge plate.

8. An ultrasonic transducer device for a humidifier, the humidifier having a vaporizing chamber for producing water vapor or mist with water supplied and contained in the vaporizing chamber, the ultrasonic transducer device comprising:
   a transducer holder having a portion for at least partially exposed to the water contained in the vaporizing chamber, the transducer holder including a central opening formed in a longitudinal direction of the transducer holder and generally vertical to the surface of the water contained in the vaporizing chamber, and a flange portion disposed at a periphery of the transducer holder, the transducer holder being formed of synthetic resin or plastic materials resistant against corrosion or oxidization from contact with the water contained in the vaporizing chamber;
   an ultrasonic transducer generally horizontally disposed within the central opening of the transducer holder;
   a support member formed of metal, the support member having an upper planar section generally horizontally disposed for coupling with the flange portion of the transducer holder, and a side section extending generally vertically from the upper planar section; and
   a heat discharge member coupled with the generally vertically extending side section of the support member and disposed below the ultrasonic transducer, the heat discharge member generally horizontally disposed and retaining a circuit board in parallel relation with each other, the heat discharge member having heat discharging fins disposed outwardly from the heat discharge member for discharging heat generated by the circuit board through the heat discharging fins.

9. The ultrasonic transducer device of claim 8, wherein the heat discharging fins is disposed generally vertically from the heat discharge member.

* * * * *